(12) United States Patent
Pelley

(10) Patent No.: US 8,120,412 B2
(45) Date of Patent: Feb. 21, 2012

(54) VOLTAGE BOOSTING SYSTEM WITH SLEW RATE CONTROL AND METHOD THEREOF

(75) Inventor: Perry H. Pelley, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 84 days.

(21) Appl. No.: 12/537,436

(22) Filed: Aug. 7, 2009

(65) Prior Publication Data

US 2011/0032026 A1    Feb. 10, 2011

(51) Int. Cl.
*G05F 1/10* (2006.01)
*G05F 3/02* (2006.01)

(52) U.S. Cl. .................................................. 327/536

(58) Field of Classification Search ............... 327/536; 363/59–60
See application file for complete search history.

(56) References Cited

U.S. PATENT DOCUMENTS

| | | | |
|---|---|---|---|
| 6,137,375 A | 10/2000 | Li | |
| 6,356,062 B1 | 3/2002 | Elmhurst et al. | |
| 6,411,531 B1 | 6/2002 | Nork et al. | |
| 6,760,865 B2 | 7/2004 | Ledford et al. | |
| 7,019,576 B1* | 3/2006 | Sancheti et al. | 327/261 |
| 7,253,676 B2* | 8/2007 | Fukuda et al. | 327/536 |
| 7,489,566 B2* | 2/2009 | Kang | 365/189.11 |
| 7,551,507 B2* | 6/2009 | Nakai et al. | 365/226 |

FOREIGN PATENT DOCUMENTS

JP    2001268894 A    *    9/2001

OTHER PUBLICATIONS

Erickson, Robert et al.; " High Efficiency DC-DC Converters for Battery-Operated Systems with Energy Managementt"; Wordwide Wireless Communications Annual Reviews on Telecommunications; pp. 1-19; CuteSeer.
Trescases, Oliver et al.; "Variable Output, Soft Switching DC/DC Converter for VLSI Dynanic Voltage Sealing Power Supply Applications"; 2004 35th Annual IEEE Power Electronics Specialists Conference; 2004; pp. 4149-4155; IEEE.
Geng, Li et al.; "A CMOS Hybrid Control Mode DC-DC Buck Converter for Embedded System"; Proceedings of 2004 International Conference on Solid-State and Integrated Circuits Technology; Oct. 18-21, 2004; pp. 1472-1475; vol. 2.; IEEE.
U.S. Appl. No. 12/479,940, filed Jun. 8, 2009.
U.S. Appl. No. 12/714,528, Sharma et al., "High Density and Low Variability Read Only Memory", filed Feb. 28, 2010.

* cited by examiner

*Primary Examiner* — Quan Tra
(74) *Attorney, Agent, or Firm* — James L. Clingan, Jr.

(57) ABSTRACT

A system includes a voltage controlled oscillator, a charge pump, and a current regulator circuit. The voltage controlled oscillator has a control input and a clock output that provides a clock signal at a clock frequency that is variable. The charge pump is coupled to the clock output and has an output that provides a boosted output voltage. The current regulator circuit is coupled to the control input of the voltage controlled oscillator to adjust the clock frequency based on a simulation of a rate of change of the boosted output voltage. This allows for a controlled slew rate for the output of the charge pump.

20 Claims, 3 Drawing Sheets

VOLTAGE BOOSTING SYSTEM WITH SLEW RATE CONTROL AND METHOD THEREOF

BACKGROUND

1. Field

This disclosure relates generally to semiconductors, and more specifically, to charge pump circuits used in semiconductors.

2. Related Art

Integrated circuits typically use charge pump circuits to boost a supply voltage to a value that is greater than the supply voltage value. Charge pumps are advantageous for creating a boost supply because they can be implemented in an integrated circuit. Many different types of charge pump circuits have been described to accomplish this function. In memory circuits, such as FLASH memory, a circuit node is charged to an elevated voltage. The circuit node is subsequently discharged. FLASH memory circuits typically require large voltage swings between the read, programming and erase potentials. For example a boosted voltage of from fifteen to twenty volts is commonly required. The slew rate or rate of change in voltage may vary significantly over such large voltage ranges. A fast slew rate may couple noise into the memory array and disturb signals or stored data. An uncontrolled slew rate results in wasted power, such as when the oscillators runs at such a high clock rate that the boost capacitors can not be fully filled before boosting occurs. The variation also results in varying circuit operation due to an uncertainty as to how quickly a voltage transition will occur.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
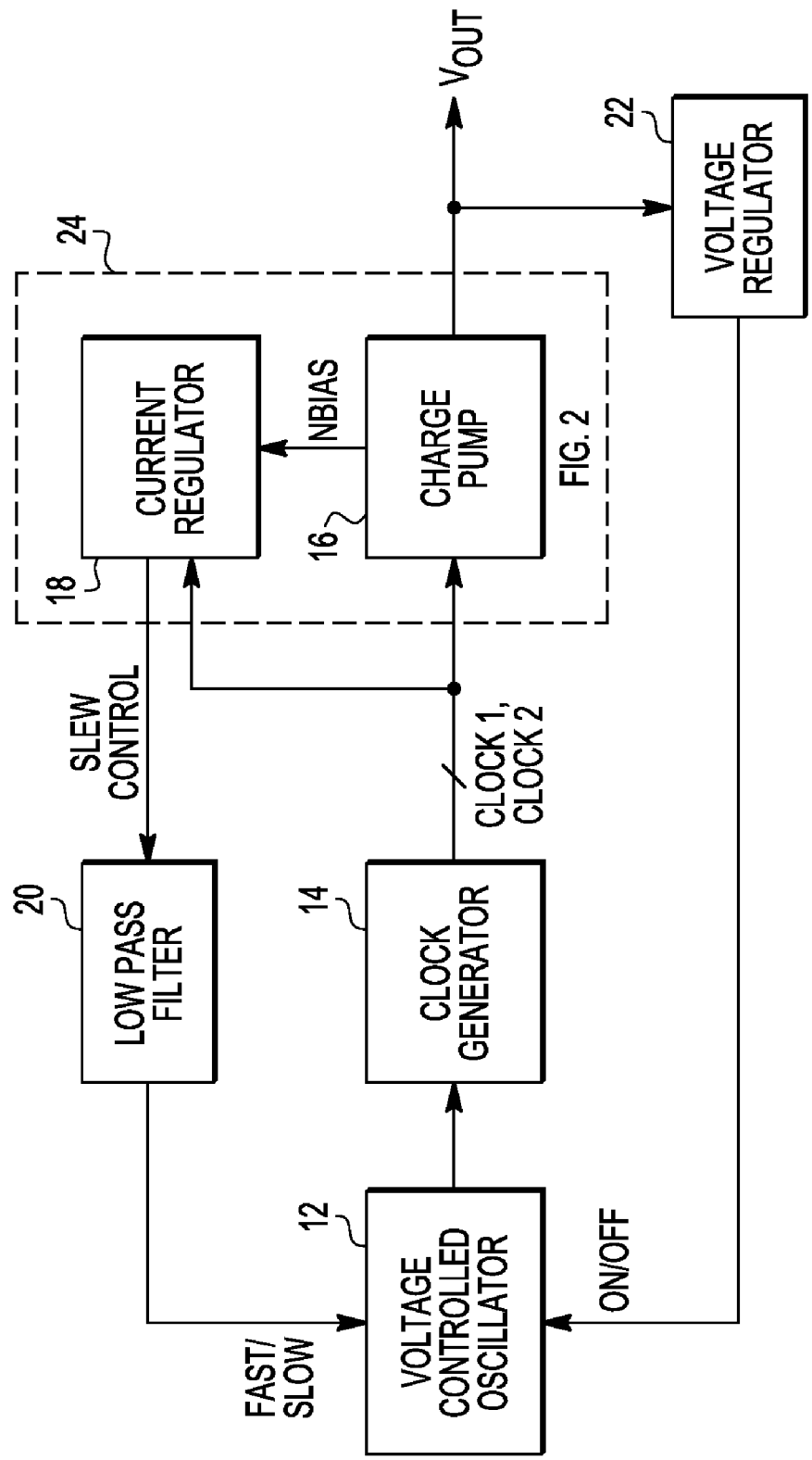
FIG. 1 illustrates in block diagram form a voltage boosting system with slew rate control in accordance with the present invention.

Illustrated in FIG. 1 is a voltage boosting system 10 having slew rate control and providing an output voltage having a regulated value. Many charge pumps exist for providing a boost voltage that is an increased value of a power supply. However in such circuits if the transition in voltage is too rapid the sudden increase in voltage may adversely affect other circuitry. The voltage boosting system 10 provides circuitry and a method for boosting a voltage with a controlled slew rate in addition to a controlled value of the boosted voltage.

Within the voltage boosting system 10 a voltage controlled oscillator 12 or VCO 12 has a first input for receiving a "Fast/Slow" signal. The "Fast/Slow" signal controls an operating speed of the voltage controlled oscillator 12. A second input of the voltage controlled oscillator 12 receives an "On/Off" signal which enables and disables the voltage controlled oscillator 12. The voltage controlled oscillator 12 provides an oscillating clock signal at an output thereof. The output of the voltage controlled oscillator 12 is connected to an input of a clock generator 14. Outputs of clock generator 14 provide a first clock signal labeled "Clock 1" and a second clock signal labeled "Clock 2". The outputs of the clock generator 14 are connected to a first input of a current regulator 18 and to an input of the charge pump 16. The charge pump 16 has an output for providing a regulated boosted output voltage labeled "$V_{OUT}$". The output of charge pump 16 is connected to an input of a voltage regulator 22. An output of voltage regulator 22 is connected to the second input of the voltage controlled oscillator 12 for providing the "On/Off" signal. An output of the current regulator 18 is connected to an input of a low pass filter 20 for providing a control signal labeled "Slew Control". The charge pump 16 and the current regulator 18 function together to form a circuit 24 that controls the rate of slew or rate of change of the output voltage. An output of the low pass filter 20 is connected to a second input of the voltage controlled oscillator 12 for providing the "Fast/Slow" control signal.

In operation the voltage boosting system 10 provides the output voltage, $V_{OUT}$, as a boosted value of a supply voltage that powers the voltage boosting system 10. The rate of change of voltage $V_{OUT}$ is proportional to the charge current from the charge pump 16. The voltage controlled oscillator 12 provides a variable frequency clock signal to the clock generator 14 that varies as a function of the value of the Fast/Slow signal provided by the low pass filter 20 in response to the voltage regulator 22 enabling the voltage controlled oscillator 12. The voltage controlled oscillator 12 provides a master clock to the clock generator 14 which generates the Clock 1 and Clock 2 signals from the master clock. In one form the Clock 1 and Clock 2 signals are complementary clock signals wherein the two signals have opposite non-overlapping phases. The duty cycle of Clock 1 and Clock 2 is approximately fifty percent (50%). A detailed explanation of the operation of the charge pump 16 and the current regulator 18 will be provided in connection with FIG. 2. In general however the charge pump 16 provides the output voltage $V_{OUT}$ having a value which is a predetermined amount greater than the supply voltage which powers the charge pump 16. The current regulator 18 simulates a rate of change of the boosted voltage to provide an indicator value that indicates a rate of change of the output voltage. The indicator value is compared within the current regulator 18 with a reference value to determine whether the indicator value is greater than or less than the reference value. A series of digital values is generated as the Slew Control signal and provided to the low pass filter 20. The low pass filter 20 functions as a smoothing filter to determine an average value of a series of digital values of the Slew Control signal over a predetermined time period. The signal smoothing function results in an output signal from the low pass filter 20 for use by the voltage controlled oscillator 12 to control whether the master clock provided to the clock generator 14 will speed up or slow down. In one form if the indicator value is greater than the reference value, the frequency of the master clock is increased to speed up the master clock. In another form if the indicator value is less than the reference value, the frequency of the master clock is decreased to slow down the master clock. Concurrent with the operation of the current regulator 18, the voltage regulator 22 is monitoring the value of the output voltage $V_{OUT}$ to determine if $V_{OUT}$ has a desired voltage value. If $V_{OUT}$ is at or within a predetermined tolerance of a desired output voltage value, the voltage regulator 22 will generate a signal which turns the voltage controlled oscillator 12 off. When $V_{OUT}$ is not within a predetermined percentage of a desired output voltage, the voltage regulator 22 will continue to generate a signal to the voltage controlled oscillator 12 that will keep the voltage controlled oscillator 12 turned on. Therefore, the voltage boosting system 10 regulates the voltage value of $V_{OUT}$ in addition to regulating the output slew rate of $V_{OUT}$. The benefit of regulating the value of the boosted output voltage may be readily apparent. The regulation of the rate of change or the slew rate of the boosted output voltage is also important. By monitoring the slew rate with the current regulator 18 and the low pass filter 20, an avoidance of too fast of a rate of change in the boosted output voltage may be ensured. If the $V_{OUT}$ voltage is boosted too quickly, such as for charging a memory storage node, the sudden increase in voltage may inadvertently generate enough noise in the array to alter the programmed value of a memory cell. Therefore, a controlled rate of charge pump boosting is often necessary to ensure proper operation within a memory or a data storage device.

Figure 2:
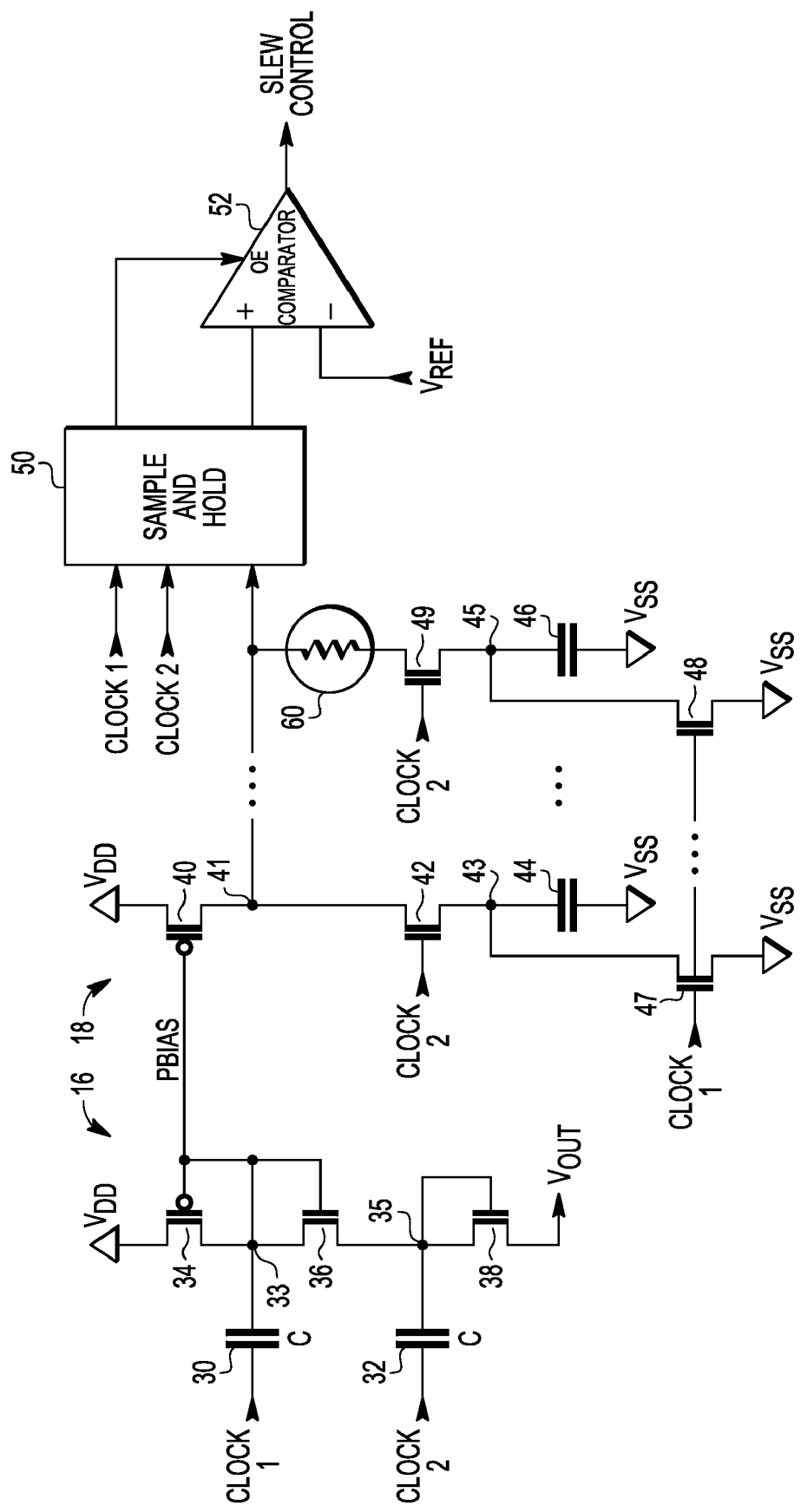
FIG. 2 illustrates in partial schematic form one embodiment of a charge pump and current regulator used in the circuit of FIG. 1.

Illustrated in FIG. 2 is a detailed implementation of one form of the circuit 24 having the charge pump 16 and the current regulator 18. Charge pump 16 may be implemented using circuit structures other than the one expressly shown. Within charge pump 16 is a diode configured P-channel transistor 34 having a first current electrode or source connected to a power supply terminal for receiving a power supply voltage labeled $V_{DD}$. A second current electrode or drain of transistor 34 is connected to a control electrode or gate thereof at a boost node 33 to place transistor 34 in a diode configuration. A bias signal labeled P Bias is a bias voltage that is provided at node 33. The drain of transistor 34 is connected to both a drain and a gate of an N-channel transistor 36 at the boost node 33. Transistor 36 is therefore connected as a diode. A first electrode of a capacitor 30 receives the Clock 1 signal from the clock generator 14 of FIG. 1. A second electrode of capacitor 30 is connected to node 33. A source of transistor 36 is connected to both a drain and a gate of an N-channel transistor 38 at a boost node 35. Transistor 38 is therefore connected as a diode. A first electrode of a capacitor 32 receives the Clock 2 signal from the clock generator 14. A second electrode of capacitor 32 is connected to node 35. A source of transistor 38 is connected to an output terminal of the charge pump 16 for providing the $V_{OUT}$ boosted voltage.

Within current regulator 18 is a tracking transistor in the form of a P-channel transistor 40 having a source connected to the $V_{DD}$ voltage terminal. A gate of transistor 40 is connected to the gate of the diode-connected transistor 34 for receiving the P Bias signal. A drain of transistor 40 is connected to a drain of an N-channel slew rate control transistor 42 at a node 41 and to a signal input of a sample and hold circuit 50. Transistor 40 is a current mirror device for conducting a ratioed mirror of the current conducted by the diode-connected transistor 34. The sample and hold circuit 50 also has clock inputs for respectively receiving the Clock 1 and Clock 2 signals from the clock generator 14. A gate of transistor 42 is connected to a terminal for receiving the Clock 2 signal from the clock generator 14. A source of transistor 42 is connected to a first electrode of a tracking capacitor 44 at a tracking node 43 and to a drain of an N-channel discharge transistor 47. A gate of transistor 47 is connected to a terminal for receiving the Clock 1 signal. A source of transistor 47 is connected to a reference voltage terminal for receiving a power supply voltage labeled $V_{SS}$. A second electrode of the tracking capacitor 44 is connected to the $V_{SS}$ reference voltage terminal. The current regulator 18 may have any number of parallel branches or legs of slew rate control transistors, tracking capacitors and discharge transistors, such as transistor 42, capacitor 44 and transistor 47 as illustrated by the multiple dots between a first and a last branch. In one form as few as one branch may be implemented. In the illustrated form a second slew rate control transistor in the form of an N-channel transistor 49 is provided in a second branch. Transistor 49 has a drain coupled by a fuse 60 to node 41. The fuse 60 may be either conductive or non-conductive depending upon whether it is desired to have two branches or one branch within the current regulator 18. It should be well understood that fuse 60 may be implemented by any type of fuse or one time programmable device. A first terminal of fuse 60 is connected to node 41, and a second terminal of fuse 60 is connected to the drain of transistor 49. A gate of slew rate control transistor 49 is connected to the Clock 2 signal from the clock generator 14. A source of transistor 49 is connected to a first electrode of a tracking capacitor 46 at a tracking node 45. A second electrode of capacitor 46 is connected to the $V_{SS}$ reference voltage terminal. A drain of an N-channel discharge transistor 48 is connected to the tracking node 45. A gate of discharge transistor 48 is connected to the Clock 1 signal. A source of discharge transistor 48 is connected to the $V_{SS}$ reference voltage terminal. The sample and hold circuit 50 has a signal output connected to a first or positive input of the comparator 52. A second or negative input of comparator 52 is connected to a reference voltage terminal for receiving a reference such as $V_{REF}$. An enable output of the sample and hold circuit 50 is connected to an output enable (OE) input of the comparator 52. An output of the comparator 52 provides the Slew Control signal to the input of the low pass filter 20. The schematic embodiment of FIG. 2 assumes that the illustrated transistors 34 and 40 which function as a current mirror are implemented as silicon-on-insulator (SOI) devices.

In operation, initially the diode-connected transistor 34 is forward-biased and charges boost capacitor 30 to $V_{DD}$ minus a transistor threshold voltage ($V_t$) when the Clock 1 signal is a logic zero or ground reference potential. As charge builds on boost capacitor 30 the potential of node 33 rises. However, the Clock 2 signal is an opposite phased signal to the Clock 1 signal and therefore has a logic one value. While the potential of node 33 rises, the diode-connected transistor 36 does not become forward biased due to the high potential at node 35 resulting from the high value of the Clock 2 signal. The diode-connected transistor 38 is forward-biased due to the elevated potential and is transferring a boost voltage from a previous charge of the boost capacitor 32 to the output terminal providing $V_{OUT}$.

When the Clock 1 signal transitions to a logic one value and the Clock 2 signal transitions to a logic zero value, diode-connected transistor 34 becomes reverse biased and diode-connected transistors 36 and 38 become forward biased and conductive. The voltage that was charged onto boost capacitor 30 in the previous phase is transferred to the boost capacitor 32.

When the Clock 1 signal transitions to a logic zero value and the Clock 2 signal transitions to a logic one value, diode-connected transistor 34 again becomes forward biased and conductive. Diode-connected transistor 36 is non-conductive and diode-connected transistor 38 is conductive to transfer the charge placed on boost capacitor 32 in the previous clock phase to the output terminal to provide $V_{OUT}$. As described herein, charge is stair-stepped by the clocking action provided by the complementary clocks, Clock 1 and Clock 2. Charge is continuously coupled from boost capacitor 30 to boost capacitor 32 to the output terminal for providing $V_{OUT}$.

The current regulator 18 uses transistor 40 as a current mirror device to provide a current to the slew rate control capacitors 44 and 46 respectively through transistor 42 and fuse 60 in series with transistor 49 that is proportional to the current conducted by diode-connected transistor 34. By creating a known ratio between the transistor sizes of transistors 34 and 40 and creating a known ratio between the sizes of tracking capacitors 44 and 46 with respect to the boost capacitor 30, variations in device performance between the charge pump 16 and current regulator 18 due to process, voltage and temperature (PVT) are minimized. Tracking capacitors 44 and 46 (and any intervening tracking capacitors) have, in one form, different capacitive values which will result in differing operating frequencies. Within the current regulator 18 a mirrored current through transistor 40 is a simulated current of the current flowing in the charge pump 16. That simulated current is used to charge the tracking capacitors 44 and 46.

Selected tracking capacitors 44 through 46 are charged for the duration of Clock 2 being high. Capacitor 44 is sized so that when the desired charge pump frequency is reached, the voltage on node 43 is approximately $V_{REF}$ at the time Clock 2 goes low. The voltage on node 43 is therefore proportional to the current through transistor 40 and the cycle time of Clock 1 and Clock 2. A falling Clock 2 (i.e. high to low transition) triggers the sample and hold circuit 50 to sample and hold the voltage on node 41 which is approximately the voltage on tracking capacitors 44 and 46. The held voltage within the sample and hold circuit 50 is compared with the reference voltage, $V_{REF}$. When the held voltage exceeds the reference voltage, a signal value of one is generated by the comparator 52. This value indicates that the frequency of the Clock 1 and Clock 2 signals is too great and needs to be reduced by the voltage controlled oscillator 12. When the held charge is less than the reference voltage, a signal value of zero is generated by the comparator 52. This value indicates that the frequency of the Clock 1 and Clock 2 signals is too high and needs to be decreased by the voltage controlled oscillator 12. During the high phase of the Clock 1 signal, both electrodes of the tracking capacitors 44 and 46 are coupled to $V_{SS}$, in part by making the discharge transistors 47 and 48 conductive. Therefore the tracking capacitors 44 and 46 are discharged during the high phase of the Clock 1 signal. The tracking nodes 43 and 45 are connected to $V_{SS}$ and are electrically isolated from transistor 40 and the sample and hold circuit 50 by the slew rate control transistors 42 and 49. During the high phase of the Clock 2 signal the slew rate control transistors 42 and 49 are conductive and permit charging of the tracking capacitors 44 and 46 via the mirrored current. The stored voltage on the tracking capacitors 44 and 46 is sampled by the falling edge of the Clock 2 signal. The sample and hold circuit 50 also provides the enable signal to the comparator 52 to determine the timing of when comparator 52 implements the comparison between the reference voltage and the sampled signal. In one form the comparator 52 is enabled during the low phase of the Clock 2 signal. By measuring the voltage placed onto the tracking capacitors 44 and 46 during the high phase of the Clock 2 signal, a simulated rate of change of the output voltage $V_{OUT}$ may be indicated by the output of the comparator 52 and the clock frequency of the voltage controlled oscillator 12 may be adjusted to control the slew rate of the boosting of the output voltage $V_{OUT}$.

Figure 3:
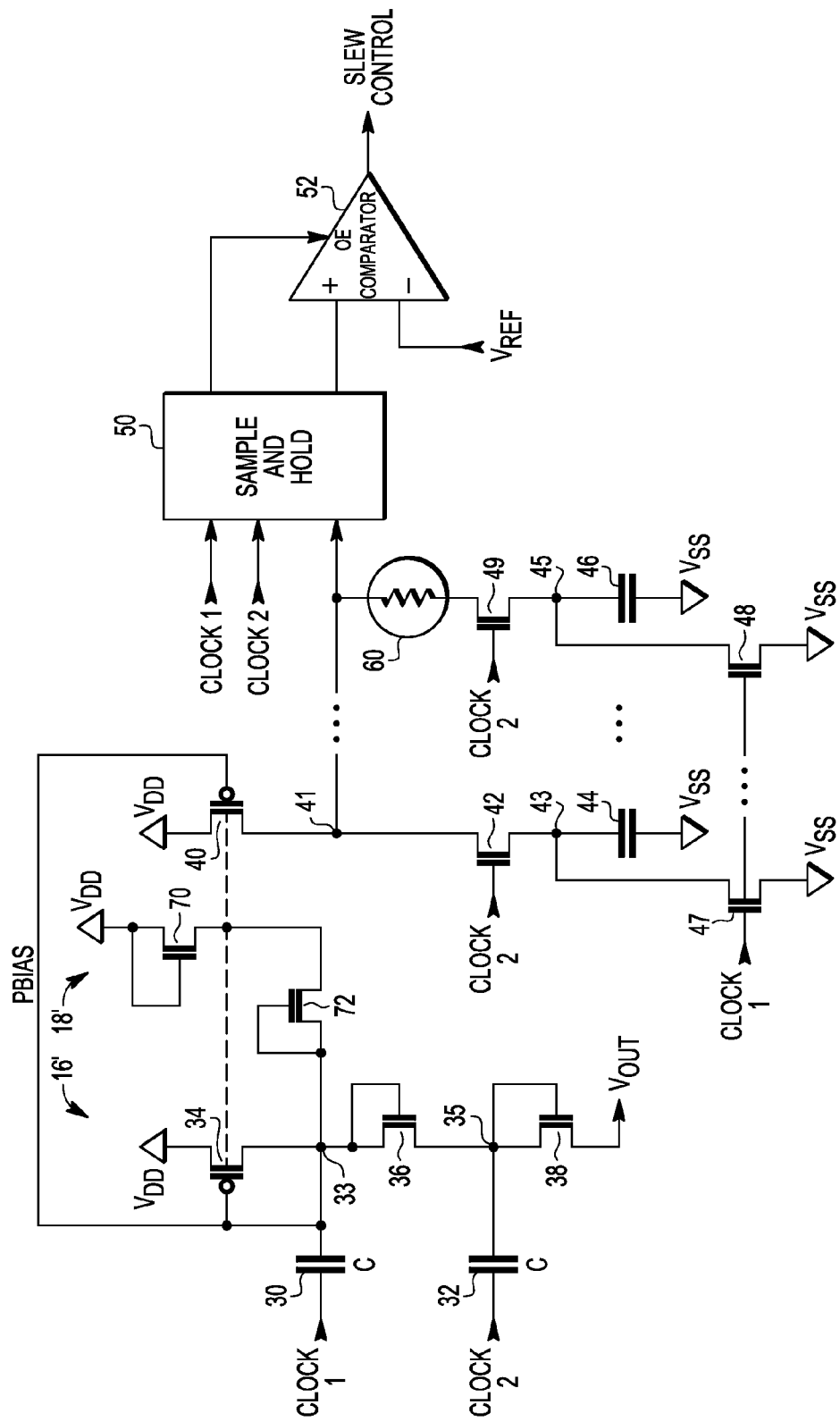
FIG. 3 illustrates in partial schematic form another embodiment of a charge pump and current regulator used in the circuit of FIG. 1.

Illustrated in FIG. 3 is another form of the circuit 24 of FIG. 2 wherein transistors 34 and 40 are implemented as conventional bulk devices. For example, in this embodiment the transistors 34 and 40 are implemented having their channels formed in bulk silicon. In this form, a circuit 24' has the illustrated charge pump 16' and the current regulator 18'. For convenience of illustration, circuit elements that are common with FIG. 2 are numbered with an identical reference number. Therefore, only the circuit connections of the modified circuit portions in this embodiment will be detailed. Transistors 34 and 40 have the same respective bulk material that is connected together as represented in FIG. 3 by a dashed line. The other connections of transistors 34 and 40 remain the same as in circuit 24. An N-channel transistor 70 within current regulator 18' has a gate and first current electrode connected to a supply terminal for receiving $V_{DD}$ so that transistor 70 is diode-connected. A second current electrode of transistor 70 is connected to the bulk terminal of transistors 34 and 40 and to a first current electrode of an N-channel transistor 72. A gate and second current electrode of transistor 72 are connected to node 33 so that transistor 72 is diode-connected. The transistors 70 and 72 are for limiting the forward bias of the parasitic P-type junction of transistors 34 and 40 to an N-well bulk. In operation, when the Clock 1 signal is high, transistor 72 is conductive charging the bulk of transistors 34 and 40 to a voltage that is no lower than a transistor threshold voltage ($V_t$) below the voltage on node 33. When the Clock 1 signal is low, transistor 70 is active (i.e. conductive) to guarantee that the voltage bulk terminals of transistors 34 and 40 are at a voltage that is no lower than a $V_t$ below the supply voltage $V_{DD}$. When the Clock 1 signal is low, transistor 72 is reversed biased and non-conductive. The operation of the charging of capacitors 30 and 32 and the conduction of diode-connected transistors 36 and 38 remains as described in the implementation of FIG. 2 and will not be repeated. The function of the one or more branches within current regulator 18' remains the same as described in FIG. 2 and also will not be repeated.

By now it should be apparent that there has been provided a voltage boosting system with slew rate control having a constant current charge pump that minimizes charge pump power in addition to managing the slew rate of the boosted voltage. A voltage controlled oscillator clock regulates the efficiency and current used in the charge pump. A constant current charge pump minimizes the charge pump power. A controlled slew rate also avoids problems associated with a suddenly boosted voltage disturbing unintended circuitry within a memory circuit.

In one form there is herein provided a system having a voltage controlled oscillator having a control input and a clock output that provides a clock signal at a clock frequency that is variable. A charge pump is coupled to the clock output having an output that provides a boosted output voltage. A current regulator circuit is coupled to the control input of the voltage controlled oscillator (VCO) to adjust the clock frequency based on a simulation of a rate of change of the boosted output voltage. In one form a clock generator is coupled between the voltage controlled oscillator (VCO) and the charge pump which generates a pair of complementary clocks in response to the clock signal. In another form a low pass filter is coupled between the current regulator circuit and the control input of the voltage controlled oscillator. In another form the charge pump is a diode-connected transistor and a charging capacitor is coupled for use in generating the boosted output voltage. The current regulator circuit is a tracking capacitor and a tracking transistor for simulating a response of the diode-connected transistor and the charging capacitor to the clock signal. In another form the current regulator circuit further has a switching transistor. The tracking transistor has a first current electrode coupled to a power supply terminal, a control electrode coupled to a control electrode of the diode-connected transistor, and a second current electrode. The tracking capacitor has a first terminal coupled to a reference terminal and a second terminal. The switching transistor is coupled between the second terminal of the tracking capacitor and the second current electrode.

In another form the system has a clock generator coupled between the voltage controlled oscillator and the charge pump. The clock generator functions to generate a first clock and a second clock in response to the clock signal, wherein the first clock and second clock are complementary. The system also has a discharge transistor that has a first current electrode coupled to the reference terminal, a control electrode for receiving the first clock, and a second current electrode coupled to the second terminal of the tracking capacitor. In another form the switching transistor is coupled by having a first current electrode coupled to the second current electrode of the tracking transistor, a control electrode for receiving the second clock, and a second current electrode coupled to the second terminal of the tracking capacitor. In yet another form the current regulator circuit has a second switching transistor having a first current electrode coupled to the second current electrode of the tracking transistor, and a second current electrode. A second tracking capacitor has a first terminal coupled to the reference terminal and a second terminal coupled to the second current electrode of the second switching transistor. In yet another form the system has a second discharge transistor having a first current electrode coupled to the reference terminal in which the reference terminal is a ground connection, a control electrode for receiving the first clock, and a second current electrode coupled to the second terminal of the second tracking capacitor. In another form the current regulator circuit further has a comparator having a first input coupled to the second current electrode of the tracking transistor, a second input coupled to a voltage reference, and an output coupled to the control input of the voltage controlled oscillator. In another form the current regulator circuit further has a sample and hold circuit coupled between the first input of the comparator and the second current electrode of the tracking transistor.

In another form there is herein provided a method of obtaining a boosted voltage. The boosted voltage is generated from a power supply voltage in response to a clock signal having a clock frequency that is variable. A rate of change of the boosted voltage is simulated to provide a simulated rate of change value. The simulated rate of change value is compared to a reference value. The clock frequency of the clock signal is changed in response to the comparing. In another form the changing of the clock frequency of the clock signal is further characterized as decreasing the clock frequency if the comparing determines that simulated rate of change indicates that rate of change of the boosted voltage is higher than a desired rate of change. In another form the changing of the clock frequency of the clock signal is further characterized as increasing the clock frequency if the step of comparing determines that simulated rate of change indicates that rate of change of the boosted voltage is lower than the desired rate of change. In another form the generating of the boosted voltage is further characterized by the boosted voltage being generated by a charge pump having a diode-connected transistor and a charging capacitor. In another form the simulating of the rate of change of the boosted voltage is further characterized as using a tracking transistor and a tracking capacitor, wherein the tracking transistor and the diode-connected transistor have a predetermined gain relationship and the charging capacitor and the tracking capacitor have a predetermined capacitance relationship.

In another form there is provided a system having a voltage controlled oscillator having a control input and a clock output that provides a clock signal at a clock frequency that is variable. A clock generator provides a first clock and a second clock at the clock frequency in response to the clock signal, wherein the first clock and second clock are complementary. A charge pump provides a boosted output voltage relative to a power supply voltage in response to the first and second clocks. A current regulator circuit is coupled to the control input of the voltage controlled oscillator to adjust the clock frequency based on a simulation of a rate of change of the boosted output voltage using the first and second clocks. In another form the system further has a low pass filter coupled between the current regulator circuit and the control input of the voltage controlled oscillator. In one form the current regulator circuit has a first transistor having a first current electrode and a control electrode coupled to a power supply node for receiving the power supply voltage and a second current electrode. A first capacitor has a first terminal selectively coupled to the second current electrode of the first transistor and a second terminal coupled to a reference terminal. In another form the current regulator circuit of the system has a first transistor and a first capacitor that are used in providing a simulated rate of change value. The charge pump has a second transistor and a second capacitor used in providing the boosted output voltage. In another form the current regulator circuit compares the simulated rate of change value to a reference value to determine if the clock frequency should be increased or decreased.

Although the invention has been described with respect to specific conductivity types or polarity of potentials, skilled artisans appreciated that conductivity types and polarities of potentials may be reversed. Moreover, terms such as "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, the circuit node for storing charge may be implemented in various types of transistor memory storage cell circuits and various types of memory, such as Flash, DRAM, SRAM and MRAM (magnetoresistive random access memory). Various types of sample and hold circuits may be implemented as well as various implementations of VCOs and clock generators. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A system, comprising:
   a voltage controlled oscillator having a control input and a clock output that provides a clock signal at a clock frequency that is variable;
   a charge pump coupled to the clock output having an output that provides a boosted output voltage; and
   a current regulator circuit coupled to the control input of the voltage controlled oscillator to adjust the clock frequency based on a simulation of a rate of change of the boosted output voltage.

2. The system of claim 1, further comprising a clock generator coupled between the voltage controlled oscillator and the charge pump which generates a pair of complementary clocks in response to the clock signal.

3. The system of claim 1, further comprising a low pass filter coupled between the current regulator circuit and the control input of the voltage controlled oscillator.

4. The system of claim 1, wherein the charge pump comprises a diode-connected transistor and a charging capacitor coupled for use in generating the boosted output voltage and the current regulator circuit comprises a tracking capacitor and a tracking transistor for simulating a response of the diode-connected transistor and the charging capacitor to the clock signal.

5. The system of claim 4, wherein the current regulator circuit further comprises a switching transistor, wherein:
   the tracking transistor has a first current electrode coupled to a power supply terminal, a control electrode coupled to a control electrode of the diode-connected transistor, and a second current electrode;
   the tracking capacitor has a first terminal coupled to a reference terminal and a second terminal; and
   the switching transistor is coupled between the second terminal of the tracking capacitor and the second current electrode.

6. The system of claim 5, further comprising:
   a clock generator coupled between the voltage controlled oscillator and the charge pump which generates a first clock and a second clock in response to the clock signal, wherein the first clock and the second clock are complementary; and
   a discharge transistor;
   wherein:
   the discharge transistor has first current electrode coupled to the reference terminal, a control electrode for receiving the first clock, and a second current electrode coupled to the second terminal of the tracking capacitor.

7. The system of claim 6, wherein the switching transistor is coupled by having a first current electrode coupled to the second current electrode of the tracking transistor, a control electrode for receiving the second clock, and a second current electrode coupled to the second terminal of the tracking capacitor.

8. The system of claim 7, wherein the current regulator circuit further comprises:
   a second switching transistor having a first current electrode coupled to the second current electrode of the tracking transistor, and a second current electrode; and
   a second tracking capacitor having a first terminal coupled to the reference terminal and a second terminal coupled to the second current electrode of the second switching transistor.

9. The system of claim 8 further comprising a second discharge transistor having a first current electrode coupled to the reference terminal in which the reference terminal is a ground connection, a control electrode for receiving the first clock, and a second current electrode coupled to the second terminal of the second tracking capacitor.

10. The system of claim 5 wherein the current regulator circuit further comprises a comparator having a first input coupled to the second current electrode of the tracking transistor, a second input coupled to a voltage reference, and an output coupled to the control input of the voltage controlled oscillator.

11. The system of claim 10, wherein the current regulator circuit further comprises a sample and hold circuit coupled between the first input of the comparator and the second current electrode of the tracking transistor.

12. A method of obtaining a boosted voltage, comprising:
   generating the boosted voltage from a power supply voltage in response to a clock signal having a clock frequency that is variable;
   simulating a rate of change of the boosted voltage to provide a simulated rate of change value;
   comparing the simulated rate of change value to a reference value; and
   changing the clock frequency of the clock signal in response to the comparing.

13. The method of claim 12, wherein the step of changing is further characterized as decreasing the clock frequency if the comparing determines that simulated rate of change indicates that rate of change of the boosted voltage is higher than a desired rate of change.

14. The method of claim 13, wherein the step of changing is further characterized as increasing the clock frequency if the step of comparing determines that simulated rate of change indicates that rate of change of the boosted voltage is lower than the desired rate of change.

15. The method of claim 12, wherein:
   the step of generating is further characterized by the boosted voltage being generated by a charge pump comprising a diode-connected transistor and a charging capacitor; and
   the step of simulating is further characterized as using a tracking transistor and a tracking capacitor, wherein the tracking transistor and the diode-connected transistor have a predetermined gain relationship and the charging capacitor and the tracking capacitor have a predetermined capacitance relationship.

16. A system, comprising:
   a voltage controlled oscillator having a control input and a clock output that provides a clock signal at a clock frequency that is variable;
   a clock generator that provides a first clock and a second clock at the clock frequency in response to the clock signal, wherein the first clock and the second clock are complementary;
   a charge pump that provides a boosted output voltage relative to a power supply voltage in response to the first and second clocks; and
   a current regulator circuit coupled to the control input of the voltage controlled oscillator to adjust the clock frequency based on a simulation of a rate of change of the boosted output voltage using the first and second clocks.

17. The system of claim 16, further comprising a low pass filter coupled between the current regulator circuit and the control input of the voltage controlled oscillator.

18. The system of claim 16, wherein the current regulator circuit comprises:
   a first transistor having a first current electrode and a control electrode coupled to a power supply node for receiving the power supply voltage and a second current electrode; and a first capacitor having a first terminal selectively coupled to the second current electrode of the first transistor and a second terminal coupled to a reference terminal.

19. The system of claim 16, wherein:

the current regulator circuit comprises a first transistor and a first capacitor that are used in providing a simulated rate of change value; and the charge pump comprises a second transistor and a second capacitor used in providing the boosted output voltage.

20. The system of claim 19, wherein the current regulator circuit compares the simulated rate of change value to a reference value to determine if the clock frequency should be increased or decreased.

* * * * *